United States Patent [19]

Kurata

[11] Patent Number: 4,473,847
[45] Date of Patent: Sep. 25, 1984

[54] BINARY CODING SYSTEM

[75] Inventor: Masami Kurata, Kanagawa, Japan

[73] Assignee: Fuji Xerox Co., Ltd., Tokyo, Japan

[21] Appl. No.: 401,430

[22] Filed: Jul. 23, 1982

[30] Foreign Application Priority Data

Jul. 24, 1981 [JP] Japan ................................ 56-115323

[51] Int. Cl.³ ............................................. H04N 1/40
[52] U.S. Cl. ......................................... 358/282; 382/52
[58] Field of Search ............... 358/282, 280, 160, 166; 382/50, 51, 52, 53

[56] References Cited

U.S. PATENT DOCUMENTS

| 4,345,314 | 8/1982 | Melamud | 358/282 |
| 4,402,013 | 8/1983 | Wargo | 358/282 |
| 4,408,231 | 10/1983 | Bushaw | 358/282 |

Primary Examiner—Howard W. Britton
Attorney, Agent, or Firm—Sughrue, Mion, Zinn, Macpeak & Seas

[57] ABSTRACT

A binary-coding device for a raster picture scanner is herein disclosed in which the miscoding produced by various states in adjacent picture elements is eliminated. The device comprises a comparator which compares the analog picture signal of the scanner with a reference voltage. A "black-or-white" state of a first picture element adjacent to the $n_{th}$, $i_{th}$ picture element to be read (the first picture element being on the $i_{th}$ subscanning line) is stored in an addressable RAM, and the state of a second picture element adjacent to the $n_{th}$, $i_{th}$ picture element to be read (the second picture element being on the $n_{th}$ main scanning line) is inputted to a flipflop. The states of the two adjacent picture elements are compared in a plurality of dissimilar logic gates which output a signal indicative of the reference voltage which should be used in order to maximize accurate coding. These signals are applied to a plurality of switches which output the desired reference voltage. In a second embodiment, a multiplexer controls the switching between a plurality of comparators, each of which has a different reference voltage.

6 Claims, 11 Drawing Figures

FIG. 1 PRIOR ART
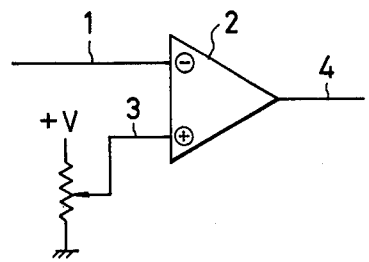
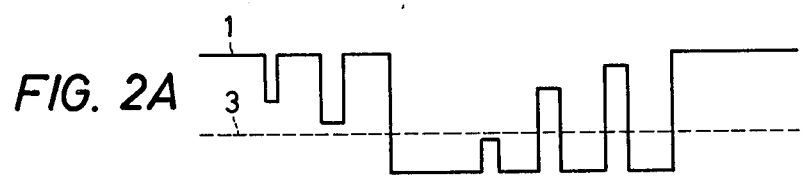
FIG. 2A
FIG. 2B
FIG. 3
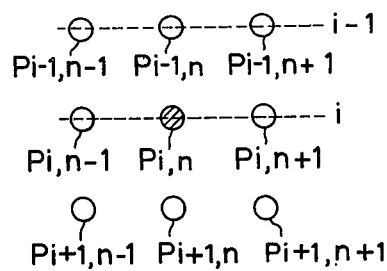
FIG. 4
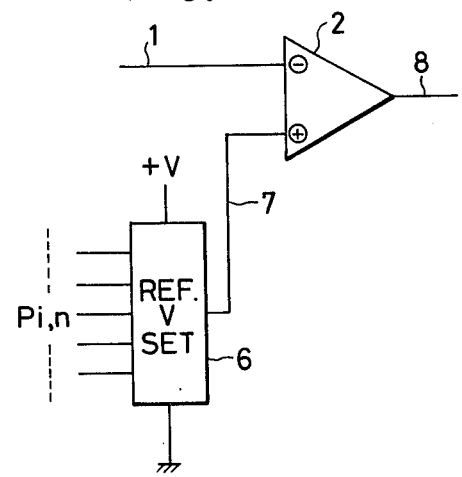

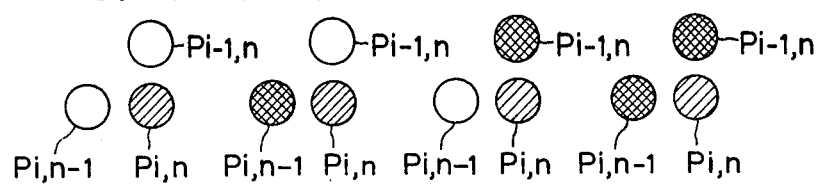
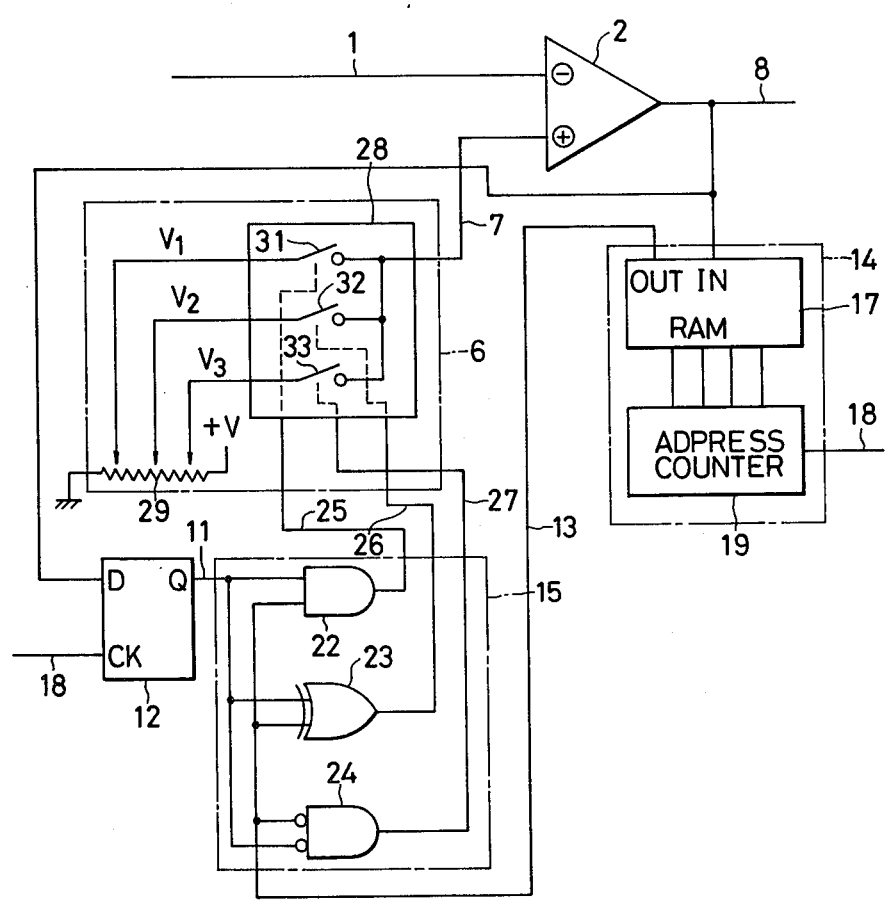

BINARY CODING SYSTEM

BACKGROUND OF THE INVENTION

The present invention relates to a binary-coding system for the conversion of an analog picture signal read out by an image sensor into a digital signal.

In a reader which reads out two-dimensional picture information with a one-dimensional image sensor, an analog picture sigal read out by the image sensor is subjected to binary-coding processing to be in correspondence to the lightness (black-and-white) of an original at each main scanning line. FIG. 1 shows a conventional binary-coding system, wherein an analog picture signal 1 is compared with a reference voltage 3 by a comparator 2, thus obtaining a binary-coded signal 4.

However, when the analog picture signal 1 having variations in levels according to a difference in thickness and/or density of characters on the original is supplied as shown in FIG. 2A, a binary-coded signal 4 (FIG. 2B) missing considerable amount of picture information will be produced from such a simple binary-coding system no matter how the reference voltage 3 is set. Therefore, an improved binary-coding system has been recently employed in which an analog picture sigal is differentiated to emphasize a change point prior to implementing the binary-coding processing. According to this improved binary-coding system, the reproducibility of the picture signal read out by the image sensor is improved in the main scanning direction. However, this system is not capable of improving reproducibility in the subscanning direction, and thus the aforementioned problem in picture quality (namely, the deterioration produced by the binary-coding of an analog picture signal) still remains.

SUMMARY OF THE INVENTION

In view of the foregoing, an object of the present invention is to provide a binary-coding system capable of changing a binary-coded level according to ambient picture information in a reader for reading out picture information on an original through raster scannings.

In accordance with the invention, a reference voltage 7 is set individually by a reference voltage setting unit 6 (as shown in FIG. 4) depending upon the digital picture signal previously decided upon for an adjacent picture element, e.g., an adjacent picture element $P_{i,\,n-1}$ in a scanning line $(i-1)$ read ahead by one of the current raster scanning, or a picture element $P_{i,\,n-1}$ read immediately before a picture element $P_{i,\,n}$ of the same scanning line (i). Then, the analog picture signal 1 supplied from the image sensor and the reference voltage individually set depending upon the picture elements are compared to each other in the comparator 2 to generate a binary-coded signal 8, thus attaining the above-mentioned object.

BRIEF DESCRIPTION OF THE DRAWINGS

In the drawings:

FIG. 1 is an essential portion of a conventional binary-coding system;

FIGS. 2A and 2B are waveform diagrams showing respectively an analog picture signal and a binary-coded signal according to the conventional system;

FIG. 3 is an explanatory diagram illustrating an arrangement of picture elements;

FIG. 4 is a block diagram illustrating the principle of the binary-coding system according to this invention;

FIGS. 5A, 5B, 5C and 5D are explanatory diagrams, each illustrating a combination of patterns of picture elements adjacent to the picture element to be binary-coded;

FIG. 6 is a block diagram showing a first embodiment of a binary-coding system according to this invention.

DETAILED DESCRIPTIONS OF THE PREFERRED EMBODIMENTS

Figure 7:
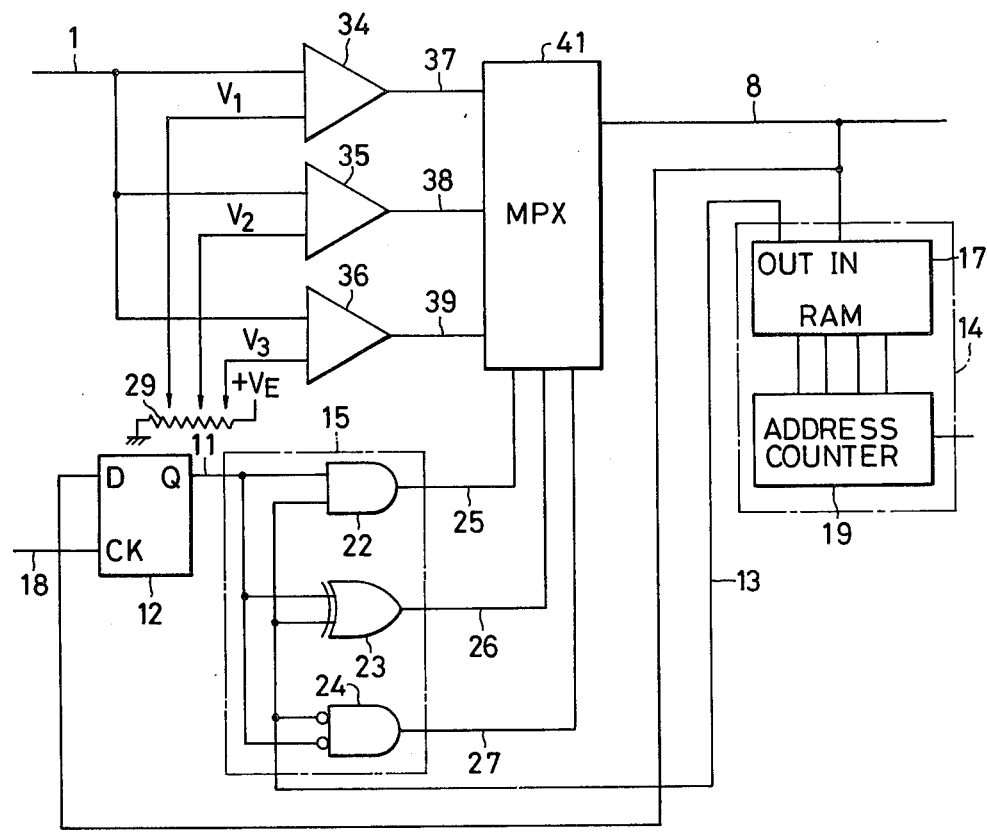
FIG. 7 is a block diagram showing a second embodiment of the binary-coding system according to this invention.

The invention will now be described with reference to the accompanying drawings.

FIG. 5 shows a combination of patterns between the picture element $P_{i,\,n}$ to be binary-coded and picture elements $P_{i-1,\,n}$ and $P_{i,\,n-1}$ adjacent thereto which have already been binary-coding. In this Figure, the picture element indicated by an empty circle is a white picture element in which a picture element is not present, and the picture element indicated by a meshy circle is a black picture element in which a picture information is present. Viewed from the picture element $P_{i,\,n}$ to be binary-coded which is indicated by hatching, there are four combinations of patterns as shown in FIGS. 5A through 5D. In the embodiment, three stages of voltages $V_1$, $V_2$, $V_3$ are previously set, and one of these voltages is selected as a reference voltage for binary-coding processing according to the pattern. The voltages are interrelated as follows:

Voltage of the analog picture signal corresponding to a perfect black $<$ voltage $V_1<$ voltage $V_2<$ voltage $V_3<$ voltage of the analog picture corresponding to a perfect white.

In this case, a relationship between each pattern shown in FIGS. 5A through 5D and the reference voltage is as follows:

(i) Pattern of FIG. 5A (hereinafter referred to as "first pattern").... Voltage $V_1$ is used as reference voltage.

(ii) Pattern of FIGS. 5B and 5C (hereinafter referred as as "second pattern").... Voltage $V_2$ is used as reference voltage.

(iii) Pattern of FIG. 5D (hereinafter referred to as "third pattern").... Voltage $V_3$ is used as reference voltage.

The reason why such an assignment is made in that, in the case of the first pattern, since the picture elements $P_{i,\,n-1}$, $P_{i-1,\,n}$ immediately before the instant element in both the main scanning and subscanning directions are both binary-coded as white picture signals, the reproducibility of the instant black picture element will have to be improved by lowering a binary-coded level. In the case of third pattern, since both the picture elements $P_{i,\,n-1}$, $P_{i-1,\,n}$ have been binary-coded as black picture signals, the reproducibility of the instant picture element will have to be improved by raising a binary-coded level. In the case of second pattern, the analog picture signal will be processed with a normal binary-coded level.

FIG. 6 is a binary-coding circuit for converting the analog picture signal into a digital picture signal according to a first embodiment of the present invention. The binary-coding circuit is provided with a flip-flop circuit 12 which outputs a binary-coded signal 11 of the picture elements $P_{i, n-1}$ immediately before the instant main scanning, and a signal delay unit 14 which outputs a binary-coded signal 13 of the picture element $P_{i-1, n}$ immediately before the instant subscanning. The combination of patterns is discriminated by a pattern discriminating unit 15 in accordance with the binary-coded signals 11, 13 outputted therefrom. The reference voltage setting unit 6 sets the reference voltage 7 according to one of the discriminated patterns, which is compared with the analog picture signal 1 in the comparator 2 to generate the binary-coded signal 8.

When the analog picture signal 1 is supplied to an inverting terminal of the comparator 2, the binary-coded signal 8 is produced from its output terminal upon implementing a binary-coded processing to be described later. The binary-coding signal 8 thus produced is supplied to both an input terminal D of the flip-flop circuit 12 and a date input terminal IN of a one-line delaying RAM (random access memory) 17 in the signal delay unit 14. A clock signal 18 synchronized with a picture signal and outputted from an image sensor (not shown) is supplied to the input terminal CK of the flip-flop circuit 12, and the binary-coded signal 11 of the picture element $P_{i, n-1}$ immediately before the instant main scanning is outputted from its output terminal 8. On the other hand, the binary-coded signal 8 supplied to the one-line delaying RAM 17 is written in the address specified by an address counter 19 which also receives the same clock signal 18 as that supplied to the flip-flop circuit 12. In this case, the binary-coded signal 13 which has been written in the RAM 17 as one line before data is outputted from its output terminal OUT.

The pattern discriminating unit 15 has first through third logical gates 22 through 24, the binary-coded signal 11 is supplied to input terminals of the respective logical gates 22 through 24 and the binary-coded signal 13 is supplied to the other input terminals thereof. When both the binary-coded signals 11 and 13 are at H levels indicating white picture elements, the first logical gate 22 discriminates the pattern as being that shown in FIG. 5A by a logical product thereof and outputs the first pattern discrimination signal 25. When the two binary-coded signals 11 and 13 are at different levels, i.e., H level and L level, indicating white and black picture elements, the second logical gate 23 discriminates the pattern to be such as shown in FIG. 5B or FIG. 5C by an exclusive OR gating, and outputs the second pattern discrimination signal 26. When both the binary-coded signals 11 and 13 are at L levels indicating a black picture element, the third logical gate 24 discriminates the pattern as shown in FIG. 5D by way of a logical product in negative logic, and outputs the third pattern discrimination signal 27.

The reference voltage setting unit 6 comprises a multiplexer 28 to which the pattern discriminating signals 25 through 27 are selectively applied, and a voltage generator 29 which applies three kinds of voltages $V_1$, $V_2$, and $V_3$ to the multiplexer 28. The voltage generator 29 generates the three kinds of voltages $V_1$, $V_2$, and $V_3$ by dividing an output voltage $V_E$ of a regulated power supply corresponding to a voltage of the analog picture signal for perfect white.

The multiplexer 28 utilizes first through third electronic switches 31 through 33. The first electronic switch 31 closes its contact while the first pattern discrimination signal 25 is supplied, and outputs the voltage $V_1$ to the output side thereof as reference voltage 7.

The second electronic switch 32 closes its contact while the second pattern discrimination signal 26 is supplied, and outputs the voltage $V_2$ to the output side thereof as reference voltage 7. The third electronic switch 33 also closes its contact while the third pattern discrimination signal 27 is supplied, and outputs the voltage $V_3$ to the output side thereof as reference voltage 7.

The comparator 2 receives the reference voltage 7 to its non-inverting input terminal to effect binary-coding of the analog picture signal 1. Therefore, a binary-coded signal prevented effectively from missing information will be obtainable by the reference voltage 7 changing in accordance with ambient information.

FIG. 7 represents another embodiment of the binary-coding circuit for the binary-coding system of the invention. The binary-coding circuit shown therein is provided with three kinds of comparators 34 through 36, each being adapted to compare the analog picture signal 1 with its own reference voltage. The first comparator 34 effects binary-coding of the analog picture signal while receiving the voltage $V_1$ outputted from the voltage generator 29 as a reference voltage, and generates the first binary-coded signal 37. The second comparator 35 effects binary-coding of the analog picture signal 1 while receiving the voltage $V_2$ as a reference voltage, and generates the second binary-coded signal 38. Likewise, the third comparator 36 effects binary-coding of the analog picture signal 1 while receiving the voltage $V_3$ as a reference voltage, and generates the third binary-coded signal 39.

The first, second and third binary-coded picture signals 37 through 39 thus generated are supplied to the designated input terminal of a multiplexer 41. The multiplexer 41 selects one of the first to third binary-coded picture signals in response to the first to third pattern discrimination signals 25 through 27 supplied selectively from the pattern discriminating unit 15, thus obtaining the binary-coded signal 8.

As described, according to the invention, a threshold level for the binary-coding processing is set upon taking the ambient picture information into consideration. Therefore, the influence of noise in the binary-coding processing is minimized as compared with a system in which the analog picture signal is subjected to binary-coding upon differentiation.

Although the invention has been described where the reference voltage is set depending upon the binary-coded signals of the adjacent two picture elements, picture elements other than those described can be used. In such a case, the range for setting the reference voltage can be a multistage system consisting of more than three valves. It is apparent that other modifications of this invention may be practiced without departing from the essential scope of this invention.

What is claimed is:

1. A binary-coding system, comprising:
   an image sensor for sensing the state of a $n_{th}$, $i_{th}$ picture element within a plurality of picture elements by scanning a $n_{th}$ line of said picture elements in a main scanning direction and producing an analog picture signal;
   a comparator for comparing said analog picture signal with a reference voltage signal and outputting a binary-coded output signal indicative of said state of said $n_{th}$, $i_{th}$ picture element;
   first storage means receiving the output of said comparator for storing a first binary-coded output signal indicative of a state of a first discrete picture element adjacent to said $n_{th}$, $i_{th}$ picture element;

second storage means receiving the output of said comparator for storing a second binary-coded output signal indicative of a state of a second discrete picture element adjacent to said $n_{th}$, $i_{th}$ picture element;

logic means for comparing said first binary-coded signal of said first storage means with said second binary-coded signal of said second storage means and producing at least one logic means output signal; and reference voltage setting means for setting the reference voltage signal of said comparator in accordance with said at least one logic means output signal.

2. The binary-coding system as in claim 1, wherein said logic means comprises a plurality of discrete dissimilar logic gates, each of which outputs a discrete logic gate output signal.

3. The binary-coding system as in claim 2, wherein said reference voltage setting means comprises a plurality of voltage-providing switches, each of which provides one of a plurality of dissimilar discrete voltages to said comparator, one of each of said switches being controlled by one of each of said discrete logic gate output signals.

4. The binary-coding system as in claim 1, wherein said reference voltage setting means comprises a plurality of voltage-providing switches, each of which provides one of a plurality of dissimilar discrete voltages to said comparator.

5. A binary-coding system comprising:

an image sensor which senses the state of an $n_{th}$, $i_{th}$ picture element within a plurality of picture elements by scanning an $n_{th}$ line of said picture elements in a main scanning direction, comparator means for comparing an analog picture signal outputted by said image sensor with a plurality of reference voltage signals, said comparator means outputting a binary-coded output signal indicative of said state of each of said plurality of picture elements;

first storage means receiving the output of said comparator means for storing a first binary-coded output signal indicative of a state of a first discrete picture element adjacent to said $n_{th}$, $i_{th}$ picture element;

second storage means receiving the output of said comparator means for storing a second binary-coded output signal indicative of a state of a second discrete picture element adjacent to said $n_{th}$, $i_{th}$ picture element;

logic means comprising a plurality of discrete dissimilar logic gates for comparing said first binary-coded signal with said second binary-coded signal, each of said dissimilar logic gates producing an output signal;

said comparator means comprising a plurality of comparator gates which compare said analog picture signal to a plurality of dissimilar reference voltage levels and output a plurality of comparison signals; and a multiplexer which receives both of said dissimilar logic gate output signals and said comparison signals and outputs one of said comparison signals as said binary-coded output signal as a function of the states of said dissimilar logic gate output signals.

6. The binary-coding system as in claim 1 or claim 5, wherein said $n_{th}$, $i_{th}$ picture element is within both an $n_{th}$ main scanning line of picture elements parallel to said main scanning direction and a $i_{th}$ sub-scanning line of picture elements perpendicular to said main scanning direction, said first adjacent discrete picture element being within said $i_{th}$ subscanning line of picture elements, and said second adjacent discrete picture element being within said $n_{th}$ main scanning line of picture elements.

* * * * *